US012260974B1

(12) United States Patent
Li

(10) Patent No.: US 12,260,974 B1
(45) Date of Patent: Mar. 25, 2025

(54) STRANDED WIRE CONDUCTORS AND METHODS FOR MANUFACTURING STRANDED WIRES

(71) Applicant: HUZHOU JIN TAI CONDUCTOR TECHNOLOGY CO., LTD., Zhejiang (CN)

(72) Inventor: Xuebin Li, Huzhou (CN)

(73) Assignee: HUZHOU JIN TAI CONDUCTOR TECHNOLOGY CO., LTD., Huzhou (CN)

( * ) Notice: Subject to any disclaimer, the term of this patent is extended or adjusted under 35 U.S.C. 154(b) by 0 days.

(21) Appl. No.: 18/830,600

(22) Filed: Sep. 11, 2024

(30) Foreign Application Priority Data

May 11, 2024 (CN) ......................... 202410579427.5

(51) Int. Cl.
*H01B 5/08* (2006.01)
*B21C 1/02* (2006.01)
(Continued)

(52) U.S. Cl.
CPC ................. *H01B 5/08* (2013.01); *B21C 1/02* (2013.01); *B22D 11/004* (2013.01);
(Continued)

(58) Field of Classification Search
CPC ... H01B 1/02; H01B 1/04; H01B 5/08; H01B 7/02; H01B 7/04; H01B 7/18; B21C 1/02;
(Continued)

(56) References Cited

U.S. PATENT DOCUMENTS

| | | | | |
|---|---|---|---|---|
| 2,055,223 A * | 9/1936 | Leon | .................... | H01B 7/0208 174/121 R |
| 3,322,515 A * | 5/1967 | Dittrich | .................. | B23K 35/02 428/564 |

(Continued)

FOREIGN PATENT DOCUMENTS

| | | |
|---|---|---|
| CN | 103109330 A | 5/2013 |
| CN | 103827329 A | 5/2014 |

(Continued)

OTHER PUBLICATIONS

Notification to Grant Patent Right for Invention in Chinese Application No. 202410579427.5 mailed on Jul. 2, 2024, 7 pages.

*Primary Examiner* — William H. Mayo, III
(74) *Attorney, Agent, or Firm* — Porus IP LLC

(57) ABSTRACT

A stranded wire conductor and a method for manufacturing a stranded wire, wherein the stranded wire conductor is made of a plurality of composite wire monofilaments stranded together, each having a nickel-tantalum-tungsten core wire, a conductive alloy tube wrapped around an outside of the nickel-tantalum-tungsten core wire, and a plating disposed on an outside of the conductive alloy tube. By stranding the plurality of composite wire monofilaments together to form the stranded wire conductor, and the composite wire monofilament is made of the nickel-tantalum-tungsten core wire, the conductive alloy tube, and the plating, the stranded wire conductor can still maintain a high strength and conductivity when operating at a temperature in a range of 600° C. to 700° C.

10 Claims, 5 Drawing Sheets

(51) Int. Cl.

| | |
|---|---|
| ***B22D 11/00*** | (2006.01) |
| ***C22C 9/00*** | (2006.01) |
| ***C22C 9/04*** | (2006.01) |
| ***C22C 19/03*** | (2006.01) |
| ***C22F 1/10*** | (2006.01) |
| ***C25D 5/50*** | (2006.01) |
| ***C25D 7/04*** | (2006.01) |
| ***C25D 7/06*** | (2006.01) |

(52) U.S. Cl.
CPC .............. *B22D 11/006* (2013.01); *C22C 9/00* (2013.01); *C22C 9/04* (2013.01); *C22C 19/03* (2013.01); *C22F 1/10* (2013.01); *C25D 5/50* (2013.01); *C25D 7/04* (2013.01); *C25D 7/0607* (2013.01)

(58) Field of Classification Search
CPC ....... B22D 11/004; B22D 11/006; C22C 9/00; C22C 9/04; C22C 19/03; C25D 5/50; C25D 7/04; C25D 7/0607
USPC ....... 174/102 R, 126.1, 126.2; 428/605, 608, 428/610, 623, 632, 633, 627, 629, 660
See application file for complete search history.

(56) References Cited

U.S. PATENT DOCUMENTS

| | | | | |
|---|---|---|---|---|
| 4,985,313 | A * | 1/1991 | Penneck | C23C 28/00 428/629 |
| 11,161,195 | B2 * | 11/2021 | Saruwatari | B23K 35/3033 |
| 2002/0164263 | A1 | 11/2002 | Harris et al. | |
| 2010/0211147 | A1 * | 8/2010 | Schiefer | H01B 1/02 174/128.1 |
| 2019/0130148 | A1 | 5/2019 | Chinya et al. | |

FOREIGN PATENT DOCUMENTS

| | | | |
|---|---|---|---|
| CN | 105139915 | A | 12/2015 |
| CN | 106128634 | A | 11/2016 |
| CN | 207009099 | U | 2/2018 |
| CN | 109536758 | A | 3/2019 |
| CN | 111192723 | A | 5/2020 |
| CN | 116913582 | A | 10/2023 |

* cited by examiner

STRANDED WIRE CONDUCTORS AND METHODS FOR MANUFACTURING STRANDED WIRES

CROSS-REFERENCE TO RELATED APPLICATION

This application claims priority to Chinese application No. 202410579427.5, filed on May 11, 2024, the entire contents of which are incorporated herein by reference.

TECHNICAL FIELD

The present disclosure relates to the field of high-temperature conductor technology, and in particular, to a stranded wire conductor and a method for manufacturing a stranded wire.

BACKGROUND

Currently, highly conductive materials with high-temperature resistance have a conductivity greater than 70% and a tensile strength greater than 500 MPa at a room temperature, but at a temperature greater than 550° C., due to the substrate undergoing a softening annealing, the tensile strength may generally decrease to 400 MPa or less. If the content of alloy of the materials is increased to increase the temperature resistance, its conductivity may decrease significantly. In a working environment at a temperature above 600° C. for a long period, tensile strengths of the current copper-based materials and silver-based materials with high-conductive properties can not be maintained above 400 MPa.

In view of the foregoing, it is desired to provide a stranded wire conductor and a method for manufacturing a stranded wire to solve the above problem.

SUMMARY

One or more embodiments of the present disclosure provide a stranded wire conductor that maintains high strength and high conductivity in a high-temperature environment. The stranded wire conductor is composed of a plurality of composite wire monofilaments stranded together, the composite wire monofilament includes a nickel-tantalum-tungsten core wire, a conductive alloy tube wrapped around an outside of the nickel-tantalum-tungsten core wire, and a plating provided on an outside of the conductive alloy tube; a composition of the nickel-tantalum-tungsten core wire includes 80% to 95% nickel, 0.5% to 10% tantalum, and 0.5% to 10% tungsten by weight, and a balance is trace impurities, an oxygen content of the nickel-tantalum-tungsten core wire is less than 9 ppm, a conductivity of the nickel-tantalum-tungsten core wire is in a range of 1% to 5%, and a tensile strength of the nickel-tantalum-tungsten core wire is not less than 1000 MPa; the conductive alloy tube is a copper-based or silver-based alloy tube; a ratio of a cross-sectional area of the nickel-tantalum-tungsten core wire in the composite wire monofilament to a total area of the composite wire monofilament is in a range of 20% to 40%; before stranding, the composite wire monofilament has a tensile strength greater than 440 MPa at 20° C., a conductivity greater than 70%, and an elongation greater than 6%; and after stranding, the composite wire monofilament has a tensile strength of not less than 400 MPa in a working environment at 600° C.

One or more embodiments of the present disclosure provide a method for manufacturing a stranded wire that maintains high strength and high conductivity in a high-temperature environment, comprising following operations:

S1, manufacturing a nickel-tantalum-tungsten core wire:

1.1, continuous casting: melting a nickel-tantalum-tungsten alloy in an oxygen-free environment followed by continuous casting to obtain a nickel-tantalum-tungsten alloy rod;

1.2, hot rolling: hot rolling the nickel-tantalum-tungsten alloy rod to reduce a diameter of the nickel-tantalum-tungsten alloy rod and refine grains of the nickel-tantalum-tungsten alloy rod to obtain a hot-rolled nickel-tantalum-tungsten alloy rod;

1.3, wire drawing: performing a wire drawing process on the hot-rolled nickel-tantalum-tungsten alloy rod to obtain a nickel-tantalum-tungsten alloy wire with a smaller diameter;

1.4, annealing; annealing the nickel-tantalum-tungsten alloy wire obtained after the wire drawing process to obtain an annealed nickel-tantalum-tungsten alloy wire; and 1.5, polishing and cleaning: polishing and cleaning a surface of the annealed nickel-tantalum-tungsten alloy wire to obtain a finished nickel-tantalum-tungsten core wire;

S2, manufacturing a copper-magnesium alloy tube:

2.1, continuous casting: continuous casting in an oxygen-free environment to obtain a copper-magnesium alloy tube blank;

2.2, ring rolling: ring rolling the copper-magnesium alloy tube blank to reduce an outer diameter and a wall thickness of the copper-magnesium alloy tube blank and refine grains of the copper-magnesium alloy tube blank to obtain a rolled tube;

2.3, drawing: drawing the rolled tube to further reduce an outer diameter and a wall thickness of the rolled tube to obtain a drawn tube;

2.4, bright annealing: bright annealing the drawn tube to obtain a bright annealed copper-magnesium alloy tube blank; and 2.5, polishing and cleaning: polishing and cleaning an inner surface of the bright annealed copper-magnesium alloy tube blank to obtain a finished copper-magnesium alloy tube;

S3, manufacturing a composite wire monofilament:

3.1, pipe threading: inserting the finished nickel-tantalum-tungsten core wire obtained in step 1.5 into the finished copper-magnesium alloy tube obtained in step 2.5 to obtain an initial composite wire;

3.2, drawing: drawing the initial composite wire to make the finished nickel-tantalum-tungsten core wire fit closely with the finished copper-magnesium alloy tube;

3.3, bright annealing: bright annealing the product obtained in step 3.2;

3.4. repeating step 3.2 and step 3.3 in sequence, and a drawing deformation rate each time does not exceed 40% until a composite wire with an outer diameter of 1 mm is obtained;

3.5, plating: performing a nickel-plating anti-corrosion processing on the composite wire obtained in step 3.4 to obtain a nickel-plated composite wire;

3.6, wire drawing: performing a wire drawing process on the nickel-plated composite wire to reduce a diameter of the composite wire to 0.1 mm to obtain the composite wire monofilament; and 3.7, heat treatment: subjecting the composite wire monofilament to an inert gas shield heat treatment to obtain a finished composite wire monofilament;

S4, manufacturing a composite stranded wire:

4.1, stranding: stranding a plurality of the finished composite wire monofilaments obtained in step 3.7 to obtain a composite stranded wire; and 4.2, heat treatment: subjecting the composite stranded wire to an inert gas shield heat treatment to obtain a stranded wire conductor.

BRIEF DESCRIPTION OF THE DRAWINGS

The present disclosure will be further illustrated by way of exemplary embodiments, which are described in detail by means of the accompanying drawings. These embodiments are not limiting, and in these embodiments, the same numbering denotes the same structure, wherein.

DETAILED DESCRIPTION

Figure 1:
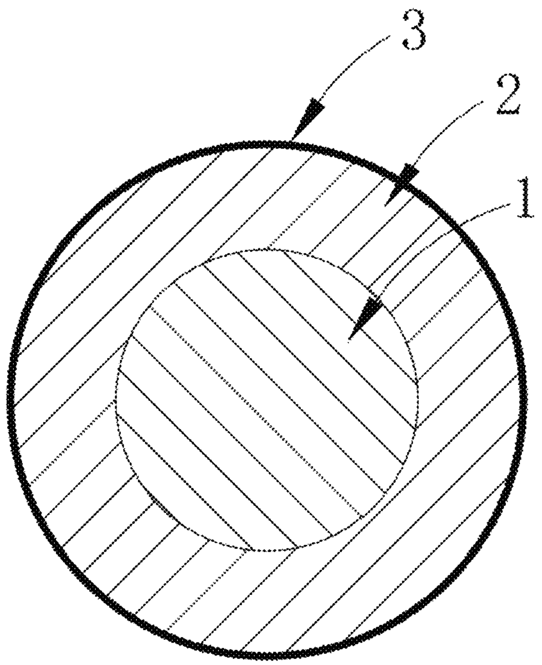
FIG. 1 is a schematic diagram illustrating an exemplary structure of a composite wire monofilament according to some embodiments of the present disclosure.

In order to more clearly illustrate the technical solutions of the embodiments of the present disclosure, the accompanying drawings required to be used in the description of the embodiments will be briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms “system”, “device”, “unit” and/or “module” as used herein is a way to distinguish between different components, elements, parts, sections or assemblies at different levels. However, the words can be replaced by other expressions if other words accomplish the same purpose.

Unless the context clearly suggests an exception, the words “one”, “a”, “an” and/or “the” do not refer specifically to the singular, but may also include the plural. Generally, the terms “including” and “comprising” suggest only the inclusion of clearly identified steps and elements that do not constitute an exclusive list, and the method or apparatus may also include other steps or elements.

Flowcharts are used in the present disclosure to illustrate operations performed by a system in accordance with embodiments of the present disclosure. It should be appreciated that the preceding or following operations are not necessarily performed in an exact sequence. Instead, steps can be processed in reverse order or simultaneously. Also, it is possible to add other operations to these processes, or to remove a step or steps from these processes.

Embodiment 1

FIG. 1 is a schematic diagram illustrating an exemplary structure of a composite wire monofilament according to some embodiments of the present disclosure.

As shown in FIG. 1, the present embodiment may provide a stranded wire conductor that maintains high strength and high conductivity in a high-temperature environment, and the stranded wire conductor may be made of a plurality of composite wire monofilaments stranded together. The composite wire monofilament includes a nickel-tantalum-tungsten core wire 1, a conductive alloy tube 2 wrapped around an outside of the nickel-tantalum-tungsten core wire 1, and a plating 3 provided on an outside of the conductive alloy tube 2.

Before stranding, the composite wire monofilament may have a tensile strength of greater than 440 MPa at 20° C., a conductivity greater than 70%, and an elongation greater than 6%.

After stranding, when working in a working environment with a temperature of 600° C. for a long period, the composite wire monofilament may have a tensile strength of not less than 400 MPa. The long period refers to a period that lasts longer than 2000 hours.

In this embodiment, a composition of the nickel-tantalum-tungsten core wire 1 may include 80% to 95% nickel, 0.5% to 10% tantalum, and 0.5% to 10% tungsten by weight, and a balance may be trace impurities, an oxygen content of the nickel-tantalum-tungsten core wire may be less than 9 ppm, a conductivity of the nickel-tantalum-tungsten core wire may be in a range of 1% to 5%, and a tensile strength of the nickel-tantalum-tungsten core wire may be not less than 1000 MPa. Exemplarily, the trace impurities may include aluminum, magnesium, silicon, molybdenum, chromium, or the like.

In some embodiments, the conductive alloy tube 2 may be a copper-based alloy tube, i.e., an alloy tube composed of copper as a base and certain amount of other elements, e.g., the conductive alloy tube 2 may be a copper-tin alloy tube, a copper-magnesium alloy tube, or the like.

Figure 2:
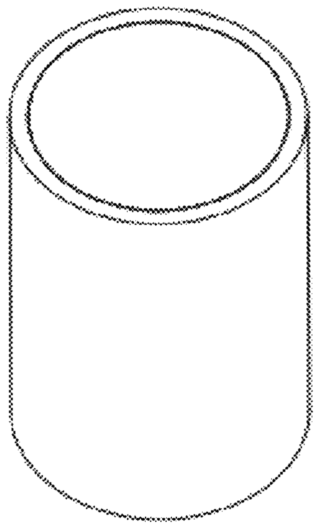
FIG. 2 is a diagram illustrating a cross-section of a composite wire monofilament consisting of a copper-based alloy tube and a nickel-tantalum-tungsten core wire according to some embodiments of the present disclosure.

FIG. 2 is a diagram illustrating an exemplary cross-section of a composite wire monofilament consisting of a copper-based alloy tube and a nickel-tantalum-tungsten core wire according to some embodiments of the present disclosure.

In this embodiment, the conductive alloy tube may be a copper-magnesium alloy tube as shown in FIG. 2.

In this embodiment, a composition of the copper-magnesium alloy tube may include 0.05% to 0.7% magnesium by weight, with a balance being copper and impurities, a content of the copper may be not less than 99%, and an oxygen content of the copper-magnesium alloy tube may be less than 9 ppm. In this embodiment, an annealed copper-magnesium alloy tube may have a tensile strength of not less than 260 MPa and a conductivity of more than 80%. Annealing may be a heat treatment process for metal, in which a metal is slowly heated to a certain temperature, held for a sufficient period, and then cooled at a suitable rate. The purpose of annealing is to reduce the hardness and improve the cutting and machinability. For more information about annealing, please refer the related descriptions of FIG. 5.

It should be noted that by adding trace elements, such as magnesium, as described above, a grain size, a high-temperature resistance degree, a conductivity, or the like, of the conductive alloy tube can be improved. The grain size may measure an average size of grains in a polycrystal, and an increase in a size of the grains implies a decrease in an area of grain boundaries, which reduces the internal defects of a metallic material. Larger grain size increases the strength and toughness of the material and improves the mechanical properties of the material, e.g., enhancing the tensile strength of the material, etc.

In this embodiment, a ratio of a cross-sectional area of the nickel-tantalum-tungsten core wire to a total area of the composite wire monofilament may be in a range of 20% to 40%, for example, the ratio of the cross-sectional area of the nickel-tantalum-tungsten core wire to the total area of the composite wire monofilament may be 20%, 30%, 40%, or the like.

In this embodiment, a softening temperature of the composite wire monofilament may be greater than 620° C.

In this embodiment, the plating 3 of the composite wire monofilament may be a high temperature-resistant and corrosion-resistant plating. For example, the plating 3 of the composite wire monofilament may be a high temperature-resistant and corrosion-resistant plating containing chromium and nickel.

In this embodiment, the plating 3 of the composite wire monofilament may be gold or nickel.

In this embodiment, the copper-magnesium alloy has good conductivity and thermal conductivity, and by utilizing the copper-magnesium alloy tube as the conductive alloy tube, the grain size, the heat resistance degree, and the conductivity of the conductive alloy tube can be improved, and by using the high temperature-resistant and corrosion-resistant plating containing gold or nickel as the plating, the stranded wire conductor in the high-temperature environment can still maintain high conductivity and high tensile strength.

Embodiment 2

The present embodiment provides a stranded wire conductor that maintains high strength and high conductivity in a high-temperature environment. The stranded wire conductor may comprise a plurality of composite wire monofilaments stranded together, the composite wire monofilament comprising a nickel-tantalum-tungsten core wire 1, a conductive alloy tube 2 wrapped around an outside of the nickel-tantalum-tungsten core wire 1, and a plating 3 disposed on an outside of the conductive alloy tube 2.

Before stranding, the composite wire monofilament may have a tensile strength of greater than 440 MPa at 20° C., a conductivity of more than 70%, and an elongation of more than 6%.

After stranding, the composite wire monofilament may have a tensile strength of not less than 400 MPa at a working temperature of 600° C. for a long period.

In this embodiment, a composition of the nickel-tantalum-tungsten core wire 1 may include 80% to 95% nickel, 0.5% to 10% tantalum, and 0.5% to 10% tungsten by weight, and a balance may be trace impurities, an oxygen content of the nickel-tantalum-tungsten core wire 1 may be less than 9 ppm, a conductivity of the nickel-tantalum-tungsten core wire 1 may be in a range of 1% to 5%, and a tensile strength of the nickel-tantalum-tungsten core wire 1 may be not less than 1000 MPa.

In some embodiments, the conductive alloy tube 2 may be a silver-based alloy tube, i.e., an alloy tube containing silver as a base with the addition of a certain amount of other elements. For example, the other elements may be copper, magnesium, or the like.

Figure 3:
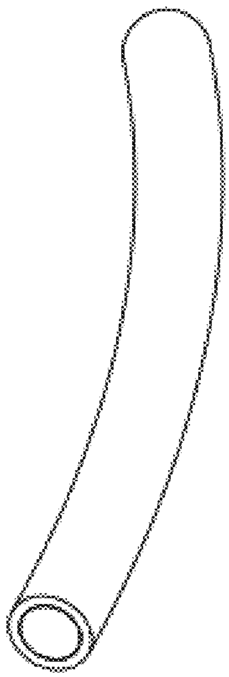
FIG. 3 is a diagram illustrating a cross-section of a composite wire monofilament consisting of a silver-based alloy tube and a nickel-tantalum-tungsten core wire according to some embodiments of the present disclosure.

FIG. 3 is a diagram illustrating an exemplary cross-section of a composite wire monofilament made of a silver-based alloy tube and a nickel-tantalum-tungsten core wire according to some embodiments of the present disclosure.

In this embodiment, a conductive alloy tube may be a silver-based alloy tube as shown in FIG. 3.

In this embodiment, a composition of the silver-based alloy tube by weight may include: a content of silver of not less than 99% and a balance may be impurities, and an oxygen content of the silver-based alloy tube may be less than 9 ppm. After annealing, a tensile strength of the silver-based alloy tube may be not less than 260 MPa, and a conductivity of the silver-based alloy tube may be greater than 90%.

In this embodiment, a ratio of a cross-sectional area of the nickel-tantalum-tungsten core wire to a total area of the composite wire monofilament may be in a range of 20% to 40%. For example, the ratio may be may be 20%, 30%, 40%, etc.

In this embodiment, a softening temperature of the composite wire monofilament may be greater than 620° C.

In this embodiment, a plating of the composite wire monofilament may be a high temperature-resistant and corrosion-resistant plating.

In this embodiment, the plating of the composite wire monofilament may be gold or nickel.

In this embodiment, the silver-based alloy has high conductivity and can be easily processed, and by utilizing the silver-based alloy tube as the conductive alloy tube, it is possible to increase the degree of high-temperature resistance, conductivity, or the like of the conductive alloy tube, and by using the high temperature-resistant and corrosion-resistant plating containing gold or nickel as the plating, a stranded wire conductor can be made to maintain high conductivity and high tensile strength in a high-temperature environment.

Embodiment 3

The present embodiment provides a stranded wire conductor that maintains high strength and high conductivity in a high-temperature environment. The stranded wire conductor may include a plurality of composite wire monofilaments stranded together, the composite wire monofilament comprising a nickel-tantalum-tungsten core wire 1, a conductive alloy tube 2 wrapped around an outside of the nickel-tantalum-tungsten core wire 1, and a plating 3 disposed on an outside of the conductive alloy tube 2.

Before stranding, the composite wire monofilament may have a tensile strength of more than 440 MPa at 20° C., a conductivity of more than 70% and an elongation of more than 6%.

After stranding, the composite wire monofilament may have a tensile strength of not less than 400 MPa in a working environment at 600° C. for a long period.

In this embodiment, a composition of the nickel-tantalum-tungsten core wire may include 80% to 95% nickel, 0.5% to 10% tantalum, and 0.5% to 10% tungsten by weight and a balance may be trace impurities, an oxygen content of the nickel-tantalum-tungsten core wire may be less than 9 ppm, a conductivity of the nickel-tantalum-tungsten core wire may be in a range of 1% to 5%, and a tensile strength of the nickel-tantalum-tungsten core wire may be not less than 1000 MPa.

In this embodiment, the conductive alloy tube 2 may be a copper-based alloy tube. More descriptions about the copper-based alloy tube can be found in the Embodiment 1.

In this embodiment, the conductive alloy tube 2 may be a copper-silver alloy tube.

In this embodiment, a composition of the copper-silver alloy tube by weight may include: silver greater than 1% with a balance of copper and impurities, and an oxygen content of the copper-silver alloy tube may be less than 9 ppm. After annealing, the copper-silver alloy tube may have a tensile strength of not less than 260 MPa and a conductivity of greater than 90%. Exemplarily, the impurities may include aluminum, magnesium, silicon, molybdenum, chromium, or the like.

In this embodiment, a ratio of a cross-sectional area of the nickel-tantalum-tungsten core wire 1 to a total area of the composite wire monofilament may be in a range of 20% to 40%, e.g., the ratio may be 20%, 30%, 40%, or the like.

In this embodiment, a softening temperature of the composite wire monofilament may be greater than 620° C.

In this embodiment, a plating of the composite wire monofilament may be a high temperature-resistant and corrosion-resistant plating. For example, the plating of the composite wire monofilament may be a high temperature-resistant and corrosion-resistant plating containing chromium and nickel.

In this embodiment, the plating of the composite wire monofilament may be gold and nickel.

In this embodiment, the copper-silver alloy has better conductivity and thermal conductivity and is less expensive, and by utilizing the copper-magnesium alloy tube as the conductive alloy tube, the degree of high-temperature resistance, conductivity, etc., of the conductive alloy tube can be improved while controlling the cost, and by using the high temperature-resistant and corrosion-resistant plating containing gold or nickel as the plating, a stranded wire conductor can still maintain a high conductivity and high tensile strength in a high-temperature environment.

Embodiment 4

The present embodiment utilizes chrome-zirconium-copper alloy (chemical equation: CuCrZr) as a high-temperature conductor, and the chrome-zirconium-copper alloy is a high-temperature-resistant conductor.

In this embodiment, a composition of the chrome-zirconium-copper alloy may include 0.1% to 0.8% of Cr, 0.1% to 0.6% of Zr, and a balance may be copper and trace impurities.

In this embodiment, at a temperature of 20° C., a tensile strength of the high-temperature conductor employing chrome-zirconium-copper alloy may be greater than 440 MPa, and a conductivity may be greater than 80%. A softening annealing temperature of the high-temperature conductor employing chrome-zirconium-copper alloy may be 550° C. Softening annealing may be a treatment process that involves heating cold-worked metals and alloys to a temperature below a recrystallization temperature and holding the metals and alloys there, allowing recovery to occur and altering the properties of the metals and alloys.

When the temperature exceeds 550° C., the high-temperature conductor employing chrome-zirconium-copper alloy undergoes the softening annealing, which results in the high-temperature conductor failing to work properly at a temperature greater than 600° C.

Example 5

Figure 5:
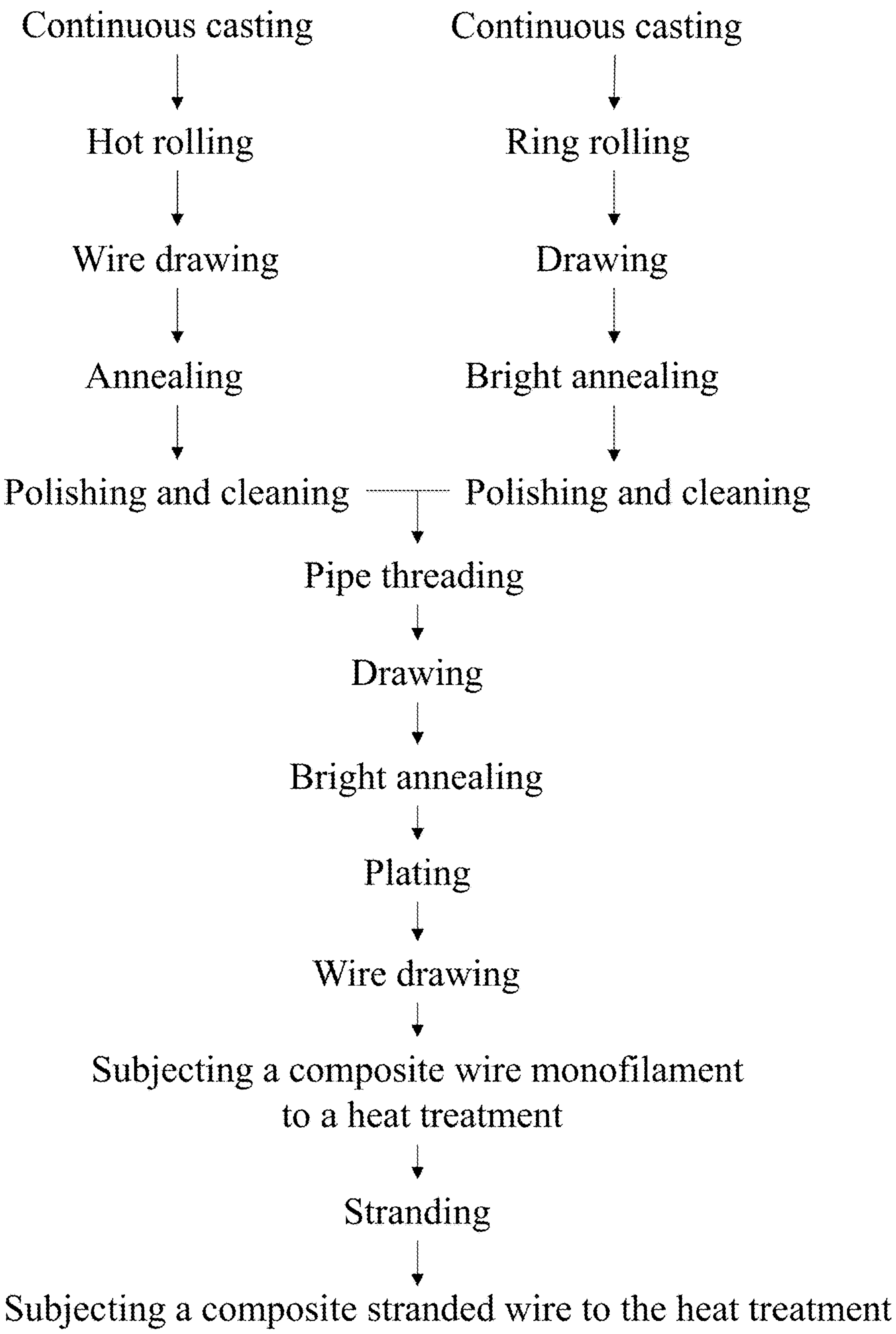
FIG. 5 is a flowchart illustrating an exemplary process for manufacturing a stranded wire according to some embodiments of the present disclosure.

FIG. 5 is a flowchart illustrating an exemplary process for manufacturing a stranded wire according to some embodiments of the present disclosure.

As shown in FIG. 5, the present embodiment provides a method for manufacturing a stranded wire that maintains high strength and high conductivity in a high-temperature environment. As an example, a method for manufacturing a stranded wire of a stranded wire conductor of embodiment 1 is provided, comprising following operations:

S1, manufacturing a nickel-tantalum-tungsten core wire

- 1.1, continuous casting: melting a nickel-tantalum-tungsten alloy in an oxygen-free environment followed by continuous casting to obtain a nickel-tantalum-tungsten alloy rod.
- 1.2, hot rolling: hot rolling the nickel-tantalum-tungsten alloy rod to reduce a diameter of the nickel-tantalum-tungsten alloy rod and refine grains of the nickel-tantalum-tungsten alloy rod to obtain a hot-rolled nickel-tantalum-tungsten alloy rod. In this embodiment, a temperature of the hot rolling may be in a range of 800° C. to 1000° C., for example, the temperature may be 800° C., 900° C., 1000° C., or the like. In some embodiments, a diameter of the nickel-tantalum-tungsten alloy rod after the hot rolling may be reduced to a range of 3 to 5 mm, for example, the diameter may be 3 mm, 4 mm, 5 mm, or the like.
- 1.3, wire drawing: performing a wire drawing process on the hot-rolled nickel-tantalum-tungsten alloy rod to obtain a nickel-tantalum-tungsten alloy wire with a smaller diameter. Wire drawing is a metalworking process, as an example, a specific process may be such that a metal is forced through a mold by an external force so that a cross-sectional area of the metal is compressed to obtain a required cross-sectional shape and size. In some embodiments, a diameter of the nickel-tantalum-tungsten alloy wire obtained after the wire drawing process may be less than 2 mm, e.g., the diameter may be 2 mm, 1 millimeter, or the like.
- 1.4, annealing: annealing the nickel-tantalum-tungsten alloy wire obtained after the wire drawing process to obtain an annealed nickel-tantalum-tungsten alloy wire. In some embodiments, an annealing temperature of an annealing treatment may be in a range of 900° C. to 1100° C., and a holding time may be more than 2 hours. For example, the annealing temperature may be 9000 C, 1000° C., 1100° C., or the like, and the holding time may be 2 hours, 3 hours, or the like.
- 1.5, polishing and cleaning: polishing and cleaning a surface of the annealed nickel-tantalum-tungsten alloy wire to obtain a finished nickel-tantalum-tungsten core wire.

In this embodiment, a diameter of the nickel-tantalum-tungsten alloy rod obtained by continuous casting in step 1.1 may be 8 mm.

In this embodiment, the temperature of the hot rolling in step 1.2 may be in a range of 800° C. to 900° C., and the diameter of the nickel-tantalum-tungsten alloy rod after the hot rolling may be in a range of 4 mm to 5 mm, e.g., the diameter may be 4 mm, 4.5 mm, 5 mm, or the like.

In this embodiment, the diameter of the nickel-tantalum-tungsten alloy wire obtained after the wire drawing process in step 1.3 may be 2 mm.

In this embodiment, the annealing temperature adopted in step 1.4 may be in a range of 800° C. to 900° C., and the holding time may be 2 hours, so that a tensile strength of the nickel-tantalum-tungsten alloy wire after the annealing may be not less than 1000 MPa. For example, the annealing temperature may be 800° C., 850° C., 900° C., or the like, and the holding time may be 2 hours, 3 hours, or the like.

S2, manufacturing a copper-magnesium alloy tube 2.1, continuous casting: continuous casting in an oxygen-free environment to obtain a copper-magnesium alloy tube blank.

2.2, ring rolling: ring rolling the copper-magnesium alloy tube blank to reduce an outer diameter and a wall thickness of the copper-magnesium alloy tube blank and refine grains of the copper-magnesium alloy tube blank to obtain a rolled tube. For example, an outer diameter of the rolled tube may be in a range of 10 mm to 15 mm, and a wall thickness of the rolled tube may be less than 1 mm.

2.3, drawing: drawing the rolled tube to further reduce the outer diameter and the wall thickness of the rolled tube to obtain a drawn tube. For example, the outer diameter of the drawn tube may be less than 6 mm and the wall thickness of the drawn tube may be less than 0.8 mm. A drawings process is similar to the wire drawing process described before, which can be found in the above descriptions.

2.4, bright annealing: bright annealing the drawn tube to obtain a bright annealed copper-magnesium alloy tube blank. In some embodiments, an annealing temperature of the bright annealing may be in a range of 350° C. to 450° C., and a holding time may be more than 2 hours. For example, the annealing temperature of the bright annealing may be 350° C., 400° C., 450° C., or the like, and the holding time may be 2 hours, 3 hours, or the like.

2.5, polishing and cleaning: polishing and cleaning an inner surface of the bright annealed copper-magnesium alloy tube blank to obtain a finished copper-magnesium alloy tube.

In this embodiment, the copper-magnesium alloy pipe blank obtained by continuous casting in step 2.1 may have an outer diameter in a range of 20 mm to 30 mm and a wall thickness in a range of 2 mm to 3 mm. In the copper-magnesium alloy tube blank, a content of magnesium may be in a range of 0.1% to 0.2% and an oxygen content of the copper-magnesium alloy tube blank may be less than 9 ppm. For example, the copper-magnesium alloy tube blank may have an outer diameter of 20 mm, 25 mm, 30 mm, or the like, a wall thickness of 2 mm, 2.5 mm, 3 mm, or the like, a content of magnesium of 0.1%, 0.15%, 0.2%, or the like, an oxygen content of 9 ppm, 8 ppm, or the like.

In this embodiment, the rolled tube obtained after the ring rolling in step 2.2 has an outer diameter in a range of 12 mm to 15 mm and a wall thickness in a range of 0.5 mm to 1.0 mm. For example, the outer diameter of the rolled tube may be 12 mm, 14 mm, 15 mm, or the like, and the wall thickness of the rolled tube may be 0.5 mm, 0.7 mm, 1.0 mm, or the like.

In this embodiment, the drawn tube obtained after the drawing in step 2.3 may have an outer diameter in a range of 5 mm to 6 mm and a wall thickness in a range of 0.6 mm to 0.8 mm. For example, the outer diameter of the drawn tube may be 5 mm, 5.5 mm, 6 mm, or the like, and the wall thickness may be 0.6 mm, 0.7 mm, 0.8 mm, or the like.

In this embodiment, the annealing temperature of the bright annealing in step 2.4 may be in a range of 300° C. to 500° C., and the holding time may be 2 hours. For example, the annealing temperature of the bright annealing may be 300° C., 400° C., 500° C., or the like.

S3, manufacturing a composite wire monofilament 3.1, pipe threading: inserting the finished nickel-tantalum-tungsten core wire obtained in step 1.5 into the finished copper-magnesium alloy tube obtained in step 2.5 to obtain an initial composite wire.

3.2, drawing: drawing the initial composite wire to make the finished nickel-tantalum-tungsten core wire fit closely with the finished copper-magnesium alloy tube.

3.3, bright annealing: bright annealing a product obtained in step 3.2. In this embodiment, an annealing temperature of the bright annealing may be in a range of 750° C. to 900° C., and a holding time may be more than 2 hours. For example, the annealing temperature of the bright annealing may be 750° C., 800° C., 900° C., or the like, and the holding time may be 2 hours, 3 hours, or the like.

3.4. repeating steps 3.2 and 3.3 in sequence, and a drawing deformation rate each time may not exceed 40%, until a composite wire with an outer diameter of 1 mm may be obtained. The drawing deformation rate may characterize a deformation amount of the wire after drawing, which is represented by a ratio of a reduction of area due to the drawing to an initial cross-sectional area (a cross-sectional area of the wire before the drawing).

3.5, plating: performing a nickel-plating anti-corrosion processing on the composite wire obtained in step 3.4 to obtain a nickel-plated composite wire. The nickel plating may be performed either by electroplating or chemical plating.

3.6, wire drawing: performing a wire drawing process on the nickel-plated composite wire to reduce a diameter of the composite wire to 0.1 mm to obtain the composite wire monofilament. More information about the wire drawing process can be found in the description above.

3.7, heat treatment: subjecting the composite wire monofilament to an inert gas shield heat treatment to obtain a finished composite wire monofilament. The inert gas-shielded heat treatment refers to a chemical treatment manner that uses an inert gas protective atmosphere to prevent a metal weld layer from oxidizing. By conducting the heat treatment in a reducing inert gas atmosphere, a bright surface that is free of oxidation and decarburization may be obtained. In some embodiments, the inert gas may include nitrogen, argon, helium, or the like.

In this embodiment, after the drawing in step 3.2, a ratio of a cross-sectional area of the nickel-tantalum-tungsten core wire to a total area of the finished copper-magnesium alloy tube may be in a range of 20% to 30%. For example, a nickel-tantalum-tungsten core wire with a cross-sectional area accounting for 20%, 25%, or 30% of the total area of the finished copper-magnesium alloy tube may be used. In this embodiment, a nickel-tantalum-tungsten core wire with a cross-sectional area accounting for 25% of the total area of the finished copper-magnesium alloy tube may be adopted.

In this embodiment, the annealing temperature of the bright annealing in step 3.3 may be in a range of 750° C. to 850° C., and the holding time may be 2 hours. For example, the annealing temperature of the bright annealing may be 750° C., 800° C., 850° C., or the like, and the holding time may be 2 hours, 3 hours, or the like.

In this embodiment, a thickness of a plating layer in step 3.5 may be not less than 0.8 micrometers, for example, the thickness may be 0.8 micrometers, 0.9 micrometers, or the like.

In this embodiment, a temperature of the heat treatment in step 3.7 may be in a range of 300° C. to 500° C., and a holding time may be in a range of 10 minutes to 30 minutes, so that an elongation of the composite wire monofilament may be not less than 6%, a conductivity of the composite wire monofilament at a room temperature may be greater than 70%, and a tensile strength of the composite wire monofilament may be in a range of 450 MPa to 550 MPa. For example, the temperature of the heat treatment may be 3000 C, 400° C., 500° C., or the like, and the holding time may be 10 minutes, 20 minutes, 30 minutes, or the like.

S4, manufacturing a composite stranded wire

- 4.1, stranding: stranding a plurality of the finished composite wire monofilament obtained in step 3.7 to obtain a composite stranded wire.
- 4.2, heat treatment: subjecting the composite stranded wire to an inert gas shield heat treatment to obtain a stranded wire conductor.

In this embodiment, in step 4.1, seven composite wire monofilaments may be stranded together to obtain the composite stranded wire. It is to be understood that a count of the composite wire monofilament may be determined according to actual needs, and is not limited to seven in this embodiment.

Figure 4:
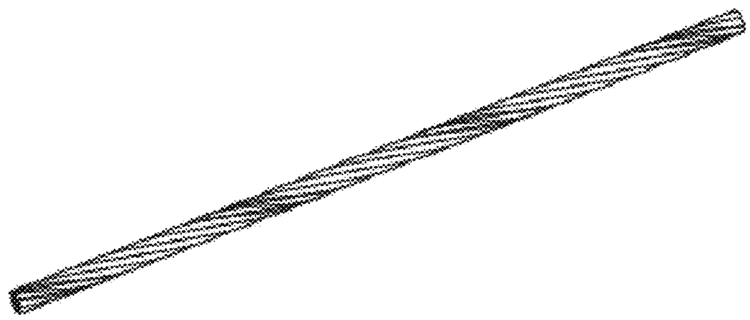
FIG. 4 is a diagram illustrating an exemplary actual product of a stranded wire conductor according to some embodiments of the present disclosure.

FIG. 4 is a diagram of an actual product of a stranded wire conductor according to some embodiments of the present disclosure.

In this embodiment, a temperature of the heat treatment in step 4.2 may be in a range of 300° C. to 500° C., and a holding time may be in a range of 10 minutes to 30 minutes, so as to make a comprehensive elongation of the composite stranded wire be more than 6% to form the stranded wire conductor, as shown in FIG. 4. For example, the temperature of the heat treatment may be 300° C., 400° C., 500° C., or the like, and the holding time may be 10 minutes, 20 minutes, 30 minutes, or the like.

The following table shows performance parameters of the stranded wire conductor in each of the above embodiments in working environments at temperatures in a range of 20° C. to 600° C. The performance parameter may be a relevant parameter reflecting a working performance of the stranded wire conductor. For example, the performance parameter may include a tensile strength, a conductivity, and an elongation.

| Embodiment | 20° C. Tensile strength/ Mps | Conductivity | Elongation | 600° C. Tensile strength/ Mpa | Conductivity | Elongation |
|---|---|---|---|---|---|---|
| Embodiment 1 | >440 | >70% | >6% | ≥440 | >25% | >15% |
| Embodiment 2 | >440 | >95% | >6% | ≥440 | >29% | >15% |
| Embodiment 3 | >440 | >80% | >6% | ≥440 | >25% | >15% |
| Embodiment 4 | >440 | >80% | >6% | ≥400 | >20% | >15% |

In the above table, Embodiment 4 shows performance parameters of a high temperature-resistant conductor often used in the prior art, and it can be seen from the above table that at a temperature of 600° C. or more, a tensile strength of the high temperature-resistant conductor is less than 400 MPa, which is not able to satisfy a normal working condition. Due to the high cost of silver, taking into account comprehensive performance parameters of the stranded wire conductor and the cost, a stranded wire conductor in Example 1 of the present disclosure is optimal relative to stranded wire conductors in Embodiment 2 and Embodiment 3, and at a temperature of 600° C. or more, the stranded wire conductors in Embodiment 1, Embodiment 2, and Embodiment 3 can still maintain a tensile strength of 440 MPa or more, realizing normal operation at a high temperature. Meanwhile, conductivities of the stranded wire conductors in Embodiment 1, Embodiment 2, and Embodiment 3 are all greater than 25% at a high temperature, satisfying working requirements of high temperature-resistance and high conductivity described in the present disclosure.

In some embodiments of the present disclosure, by a method for manufacturing a stranded wire provided above, it is possible to manufacture a stranded wire conductor that maintains high strength, conductivity, and fatigue-resistant properties even working for a long period at a temperature in a range of 600° C. to 700° C., which can solve the current problems of low conductivity or low strength of heat-resistant conductors in high-temperature environments.

The basic concepts have been described above, and it is apparent to those skilled in the art that the foregoing detailed disclosure serves only as an example and does not constitute a limitation of the present disclosure. While not expressly stated herein, a person skilled in the art may make various modifications, improvements, and amendments to the present disclosure. Those types of modifications, improvements, and amendments are suggested in the present disclosure, so those types of modifications, improvements, and amendments remain within the spirit and scope of the exemplary embodiments of the present disclosure.

Also, the present disclosure uses specific words to describe embodiments of the present disclosure, such as “an embodiment”, “one embodiment”, and/or “some embodiment” means a feature, structure, or characteristic associated with at least one embodiment of the present disclosure. Accordingly, it should be emphasized and noted that “one embodiment” or “an embodiment” or “an alternative embodiment” in different places in the present disclosure do not necessarily refer to the same embodiment. In addition, certain features, structures, or characteristics in one or more embodiments of the present disclosure may be suitably combined.

Similarly, it should be noted that in order to simplify the presentation of the present disclosure, and thereby aid in the understanding of one or more embodiments of the invention, the foregoing descriptions of embodiments of the present disclosure sometimes group multiple features together in a single embodiment, accompanying drawings, or a description thereof. However, this method of disclosure does not imply that the objects of the present disclosure require more features than those mentioned in the claims. Rather, claimed subject matter may lie in less than all features of a single foregoing disclosed embodiment.

Some embodiments use numbers to describe the number of components, attributes, and it should be understood that such numbers used in the description of embodiments are modified in some examples by the modifiers “approximately”, “nearly”, or “substantially”. Unless otherwise noted, the terms “approximately”, “nearly”, or “substantially” indicates that a ±20% variation in the stated number is allowed. Correspondingly, in some embodiments, the numerical parameters used in the present disclosure and claims are approximations, which can change depending on the desired characteristics of individual embodiments. In some embodiments, the numerical parameters should take into account the specified number of valid digits and employ general place-keeping. While the numerical domains and parameters used to confirm the breadth of their ranges in some embodiments of the present disclosure are approximations, in specific embodiments such values are set to be as precise as possible within a feasible range.

For each of the patents, patent applications, patent application disclosures, and other materials cited in the present disclosure, such as articles, books, specification sheets, publications, documents, etc., the entire contents of which are hereby incorporated herein by reference. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those set forth herein, the descriptions, definitions and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be considered to be consistent with the teachings of the present disclosure as an example, not as a limitation. Correspondingly, the embodiments of the present disclosure are not limited to the embodiments expressly presented and described herein.

What is claimed is:

1. A stranded wire conductor that maintains high strength and high conductivity in a high temperature environment, wherein the stranded wire conductor is composed of a plurality of composite wire monofilaments stranded together, the composite wire monofilament includes a nickel-tantalum-tungsten core wire, a conductive alloy tube wrapped around an outside of the nickel-tantalum-tungsten core wire, and a plating provided on an outside of the conductive alloy tube;

a composition of the nickel-tantalum-tungsten core wire includes 80% to 95% nickel, 0.5% to 10% tantalum, and 0.5% to 10% tungsten by weight, and a balance is trace impurities, an oxygen content of the nickel-tantalum-tungsten core wire is less than 9 ppm, a conductivity of the nickel-tantalum-tungsten core wire is in a range of 1% to 5%, and a tensile strength of the nickel-tantalum-tungsten core wire is not less than 1000 Mpa;

the conductive alloy tube is a copper-based or silver-based alloy tube;

a ratio of a cross-sectional area of a nickel-tantalum-tungsten alloy core wire in a composite wire to a total area of the composite wire is in a range of 20% to 40%;

before stranding, the composite wire monofilament has a tensile strength being greater than 440 MPa at 20° C., a conductivity being greater than 70%, and an elongation being greater than 6%; and after stranding, the composite wire monofilament has a tensile strength being not less than 400 Mpa in a working environment at 600° C.

2. The stranded wire conductor that maintains high strength and high conductivity in a high temperature environment according to claim 1, wherein the conductive alloy tube is a copper-magnesium alloy tube, and a composition of the copper-magnesium alloy tube includes 0.05% to 0.7% magnesium by weight, and a balance is copper and impurities, a content of the copper is not less than 99%, and an oxygen content of the copper-magnesium alloy tube is less than 9 ppm; a tensile strength of the copper-magnesium alloy tube after annealing is not less than 260 MPa, and a conductivity of the copper-magnesium alloy tube is greater than 80%.

3. The stranded wire conductor that maintains high strength and high conductivity in a high temperature environment according to claim 1, wherein the plating is a high temperature-resistant and corrosion-resistant plating.

4. The stranded wire conductor that maintains high strength and high conductivity in a high temperature environment according to claim 3, wherein the plating is gold or nickel.

5. The stranded wire conductor that maintains high strength and high conductivity in a high temperature environment according to claim 1, wherein a softening temperature of the composite wire is greater than 620° C.

6. A method for manufacturing a stranded wire that maintains high strength and high conductivity in a high temperature environment, comprising following operations:

S1, manufacturing a nickel-tantalum-tungsten core wire:

1.1, continuous casting: melting a nickel-tantalum-tungsten alloy in an oxygen-free environment followed by continuous casting to obtain a nickel-tantalum-tungsten alloy rod;

1.2, hot rolling: hot rolling the nickel-tantalum-tungsten alloy rod to reduce a diameter of the nickel-tantalum-tungsten alloy rod and refine grains of the of the nickel-tantalum-tungsten alloy rod;

1.3, wire drawing: performing a wire drawing process on a hot-rolled nickel-tantalum-tungsten alloy rod to obtain a nickel-tantalum-tungsten alloy wire with a smaller diameter;

1.4, annealing: annealing the nickel-tantalum-tungsten alloy wire obtained after the wire drawing process; and 1.5. polishing and cleaning: polishing and cleaning a surface of the annealed nickel-tantalum-tungsten alloy wire to obtain a finished nickel-tantalum-tungsten core wire;

S2, manufacturing a copper-magnesium alloy tube:

2.1, continuous casting: continuous casting in an oxygen-free environment to obtain a copper-magnesium alloy tube blank;

2.2, ring rolling: ring rolling the copper-magnesium alloy tube blank to reduce a diameter and wall thickness of the copper-magnesium alloy tube blank and refine grains of the copper-magnesium alloy tube blank to obtain a rolled tube;

2.3. drawing: drawing the copper-magnesium alloy tube blank after the ring rolling to further reduce a diameter and wall thickness of the copper-magnesium alloy tube blank after the ring rolling to obtain a drawn tube;

2.4. bright annealing: bright annealing the tube blank after the ring rolling; and 2.5. polishing and cleaning: polishing and cleaning an inner surface of the tube blank to obtain a finished copper-magnesium alloy tube;

S3, manufacturing a composite wire:

3.1. pipe threading: inserting the nickel-tantalum-tungsten core wire obtained in step 1.5 into the copper-magnesium alloy tube obtained in step 2.4 to obtain an initial composite wire;

3.2. drawing: drawing the initial composite wire obtained in step 3.1 to make the nickel-tantalum-tungsten core wire fit closely with the copper-magnesium alloy tube;

3.3. bright annealing: bright annealing a product obtained in step 3.2;

3.4. repeating step 3.2 and step 3.3 in sequence, and a drawing deformation rate each time does not exceed 40%, until a composite wire with an outer diameter of 1 mm is obtained;

3.5. plating: performing a nickel-plating anti-corrosion processing on the composite wire obtained in step 3.4;

3.6. wire drawing: performing a wire drawing process on the composite wire after the platina to make a diameter of the composite wire to be 0.1 mm to obtain a composite wire monofilament; and 3.7. heat treatment: subjecting the composite wire monofilament to an inert gas protection heat treatment;

S4, manufacturing a composite stranded wire 4.1. stranding: stranding a plurality of the composite wire monofilament obtained in step 3.7 to obtain the composite stranded wire; and 4.2. heat treatment: subjecting the composite stranded wire strand to an inert gas protection heat treatment.

7. The method according to claim 6, wherein a diameter of the nickel-tantalum-tungsten alloy rod obtained by continuous casting in step 1.1 is 8 mm;

a hot rolling temperature in step 1.2 is in a range of 800° C. to 900° C., and a diameter of the hot-rolled nickel-tantalum-tungsten alloy rod is in a range of 4 mm to 5 mm;

a diameter of the nickel-tantalum-tungsten alloy wire obtained after the wire drawing process in step 1.3 is 2 mm; and an annealing temperature in step 1.4 is in a range of 800° C. to 900° C. and a holding time is 2 hours, so that a tensile strength of the nickel-tantalum-tungsten alloy wire is not less than 1000 MPa.

8. The method according to claim 6, wherein an outer diameter of the copper-magnesium alloy tube blank obtained by continuous casting in step 2.1 is in a range of 20 mm to 30 mm, a wall thickness is in a range of 2 mm to 3 mm, and a content of magnesium in the tube blank is in a range of 0.1% to 0.2%, and an oxygen content is less than 9 ppm;

an outer diameter of the rolled tube obtained after the ring rolling in step 2.2 is in a range of 12 mm to 15 mm, and a wall thickness is in a range of 0.5 mm to 1.0 mm;

an outer diameter of the drawn tube obtained after the drawing in step 2.3 is in a range of 5 mm to 6 mm, and a wall thickness is in a range of 0.6 mm to 0.8 mm; and an annealing temperature of the bright annealing in step 2.4 is in a range of 300° C. to 500° C., and a holding time is 2 hours.

9. The method according to claim 6, wherein a cross-sectional area of the nickel-tantalum-tungsten core wire accounts for 20% to 30% after the drawing in step 3.2;

an annealing temperature of the bright annealing in step 3.3 is in a range of 750° C. to 850° C., and a holding time is 2 hours;

a plating thickness in step 3.5 is not less than 0.8 micrometers; and a heat treatment temperature in step 3.7 is in a range of 300° C. to 500° C. and a holding time is in a range of 10 minutes to 30 minutes, so that an elongation of the composite wire monofilament reaches 6%, a conductivity at a room temperature is greater than 70%, and a tensile strength is in a range of 450 MPa to 550 MPa.

10. The method according to claim 6, wherein a heat treatment temperature in step 4.2 is in a range of 300° C. to 500° C. and a holding time is in a range of 10 minutes to 30 minutes, so that a comprehensive elongation of the composite stranded wire is greater than 6%, thereby forming a soft stranded wire conductor.

* * * * *